US005764131A

United States Patent [19]

Twining et al.

[11] Patent Number: 5,764,131

[45] Date of Patent: Jun. 9, 1998

[54] MULTI-FUNCTION BEEPER AND HOUSING

[75] Inventors: Robert E. Twining, Pinckney; Douglas R. Hennigar, Ann Arbor, both of Mich.

[73] Assignee: Beep-It Corporation, Ann Arbor, Mich.

[21] Appl. No.: 805,423

[22] Filed: Feb. 25, 1997

Related U.S. Application Data

[63] Continuation of Ser. No. 339,062, Nov. 14, 1994, abandoned.

[51] Int. Cl.$^6$ .......... H04Q 1/30

[52] U.S. Cl. .......... 340/311.1; 340/825.44; 340/328

[58] Field of Search .......... 340/574, 328, 340/311.1, 825.44, 825.45, 426, 321; 455/90, 128, 347, 348, 349; 361/395, 399

[56] References Cited

U.S. PATENT DOCUMENTS

| | | | |
|---|---|---|---|
| D. 344,084 | 2/1994 | Chen | 455/90 |
| 3,128,431 | 4/1964 | Walker | 455/128 |
| 3,345,568 | 10/1967 | Errichiello et al. | 455/347 |
| 4,558,396 | 12/1985 | Kawabata et al. | 361/399 |
| 4,578,739 | 3/1986 | McKee et al. | 361/395 |
| 4,653,115 | 3/1987 | Holcomb | 455/128 |
| 4,719,454 | 1/1988 | Hopkins et al. | 340/574 |
| 4,755,816 | 7/1988 | DeLuca | 340/311.1 |
| 4,768,299 | 9/1988 | Ackeret | 40/490 |
| 4,801,925 | 1/1989 | Davis | 340/574 |
| 4,893,351 | 1/1990 | McKee et al. | 340/311.1 |
| 4,912,602 | 3/1990 | Zurek et al. | 455/128 |
| 4,933,988 | 6/1990 | Thibault | 455/349 |
| 4,969,206 | 11/1990 | Desrochers | 455/90 |
| 4,991,225 | 2/1991 | Holcomb et al. | 455/90 |
| 5,014,046 | 5/1991 | Minami | 340/311.1 |
| 5,140,310 | 8/1992 | DeLuca et al. | 340/636 |
| 5,146,615 | 9/1992 | Hodsdon et al. | 455/90 |
| 5,192,947 | 3/1993 | Neustein | 340/825.44 |
| 5,214,794 | 5/1993 | Van Wijnen | 455/90 |
| 5,261,122 | 11/1993 | Otsuki et al. | 455/90 |
| 5,265,275 | 11/1993 | Goldenberg et al. | 455/349 |
| 5,429,301 | 7/1995 | Franks | 239/154 |
| 5,445,158 | 8/1995 | Pompei | 128/664 |

*Primary Examiner*—Brent A. Swarthout
*Attorney, Agent, or Firm*—Harness, Dickey & Pierce, P.L.C.

[57] ABSTRACT

A multi-function beeper device and housing provides a case having a removable cover which allows for a tailoring of visible facial features to change the look and tactile feel of an electronic communications device. Preferably, the device has a body casing with a removable cover face in which is housed a sound driver circuit comprising a masked integrated circuit sound chip and a clock/alarm integrated circuit selectively user operated via external buttons to generate a delayed pager sound, a panic alarm sound, an hourly chime, or a timed alarm clock triggered sound comprising either a pager sound or a panic alarm sound. Furthermore, both the pager sounds and panic alarm sounds can be user set to adjustable threshold audible levels.

16 Claims, 4 Drawing Sheets

MULTI-FUNCTION BEEPER AND HOUSING

This is a continuation of Ser. No. 08/339,062, filed Nov. 14, 1994, now abandoned.

FIELD OF THE INVENTION

This invention relates to electronic tone-generating devices and more particularly to a multi-function beeper device including a case with a panic alarm and alarm clock.

BACKGROUND OF THE INVENTION

A number of removable and disengagable cover features are presently utilized on electronic message devices having a pager-like appearance. A typical electronic pager has a removable cover portion on the bottom edge of the casing for inserting and removing batteries. The cover is usually small, and preferably is placed on a seldom-viewed portion of the casing in order to hide its presence from the user or others during use.

Otsuki et al., U.S. Pat. No. 5,261,122 features a radio communication circuit contained in a housing having a removable and interchangeable exchange panel and clip for use on the rear surface of the housing. However, Otsuki et al. does not show an electronic-equipment housing having removable facial features which substantially encompass a large visible portion of the housing and is visible to a user or others during use.

Kent, U.S. Pat. No. De. 344,084 discloses a transparent display pager box for use in encasing electronic pagers. However, Kent uses a traditional bottom edge battery cover which does not incorporate removable facial features.

Kowabata et al., U.S. Pat. No. 4,558,396 discloses an electrical equipment casing having a transparent plate beneath which is mounted a display panel for displaying information therethrough. Additionally, a removable cover is provided on a side edge of the casing to allow battery access. However, Kowabata et al. does not disclose any removable facial features which change decorative features on the casing.

It is also presently known to incorporate an alarm clock feature on an electronic pager device. However, the incorporation of additional features is not presently known in the art.

A multiple-function electronic device presently known in the art is a portable radio which in combination includes a panic alarm. Preferably, the alarm is used by joggers who can listen to the radio while jogging, and at the same time, the jogger has a panic alarm operable by the user to distract or discourage attackers who might attack the jogger. However, use of the panic alarm in a beeper device which simulates a real pager, or is actually a real pager, is not presently known.

SUMMARY OF THE INVENTION

Pursuant to this invention, a multiple function beeper is provided which has a housing with removable facial features including a cover having a face opening with a pair of fitting grooves for receiving a cover face plate along a pair of engaging edges which slidably engage the cover in the fitting groove. Preferably, an alarm clock having a visible clock display and a panic alarm are provided in combination therein. Furthermore, a delayed pager-like sound is preferably additionally provided for activation either manually with a slide switch or by alarm clock/chime output trigger. Furthermore, selectable output volumes are preferably provided for tailoring sound output to a user-preferred level for a specific use. Preferably, the tailored output volume is applied to the panic alarm feature only. Alternatively, separate adjustments could be provided for both the panic and pager features.

Alternatively, an alarm clock having a clock display is provided in combination with a manually activated delayed pager-like sound producing device. The device produces a pager-like sound in response to the delayed pager activation. Preferably, a panic alarm is additionally provided which can be separately or alternatively activated by either the alarm clock, or a switch such as a button or slide switch, which activates the panic alarm in an emergency without delay.

Preferably, the removable cover face plate has a speaker port whose presence is masked by either surface, structural or decorative features for through-outputting speaker sounds from within the case. Additionally, the cover face plate has a pair of opposite engaging edges which slidably engage in the front face of the casing to substantially fill the front face and engage with a pair of opposite and complementary fitting grooves therealong. Traditionally, a fastening member releasably couples the cover face plate to the casing in a removably assembled state.

The cover face plate preferably includes decorative visible facial features which can be removably interchanged by slidably removing the cover face plate and inserting a new face plate having visibly-distinct and different facial features. In one variation, the cover face plate is transparent so as to allow the display of a photograph or message beneath the face plate for visible viewing from the casing exterior. In another variation, advertising is affixed to the cover by an applique label. Furthermore, the cover or casing can be translucent, transparent, or colored which allows one to coordinate the visible appearance of the beeper with its surrounding.

Objects, features and advantages of this invention are to provide a multi-function electronic information device within a housing having a removable face plate for decoratively changing facial features that is quick and easy to assemble, reduces the number of parts and fasteners, and is rugged, durable, and of economical manufacture and assembly, and includes internal electronic components for producing a panic alarm, an alarm clock feature, and a simulated delayed-pager feature.

BRIEF DESCRIPTION OF THE DRAWINGS

These and other objects, features and advantages of this invention will be apparent from the following detailed description, claims and accompanying drawings in which:

DETAILED DESCRIPTION OF THE PREFERRED EMBODIMENT

Figure 1:
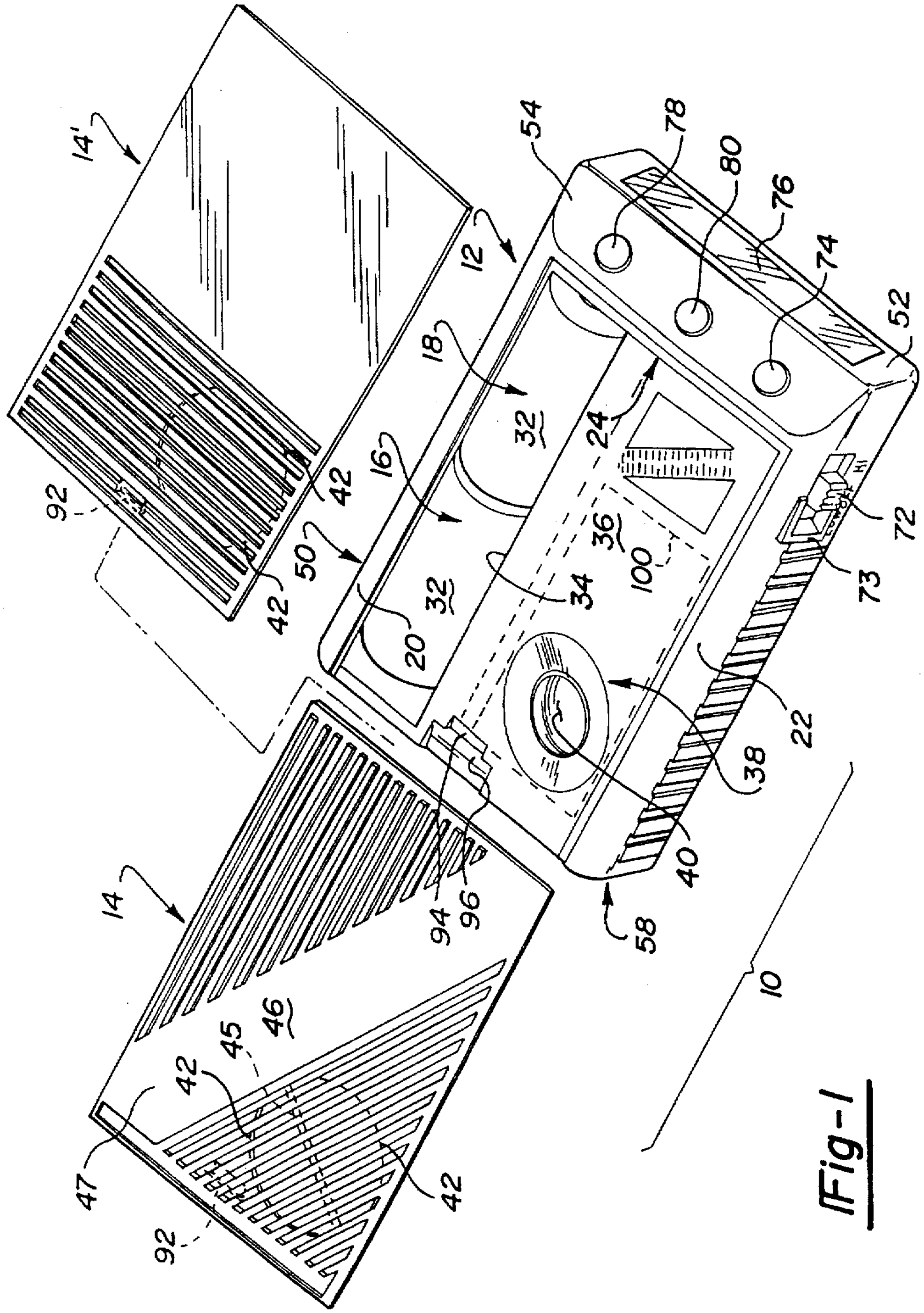
FIG. 1 is a perspective view of the multi-function beeper and housing embodying this invention showing the cover as well as an alternative cover in a removed position.
Figure 2:
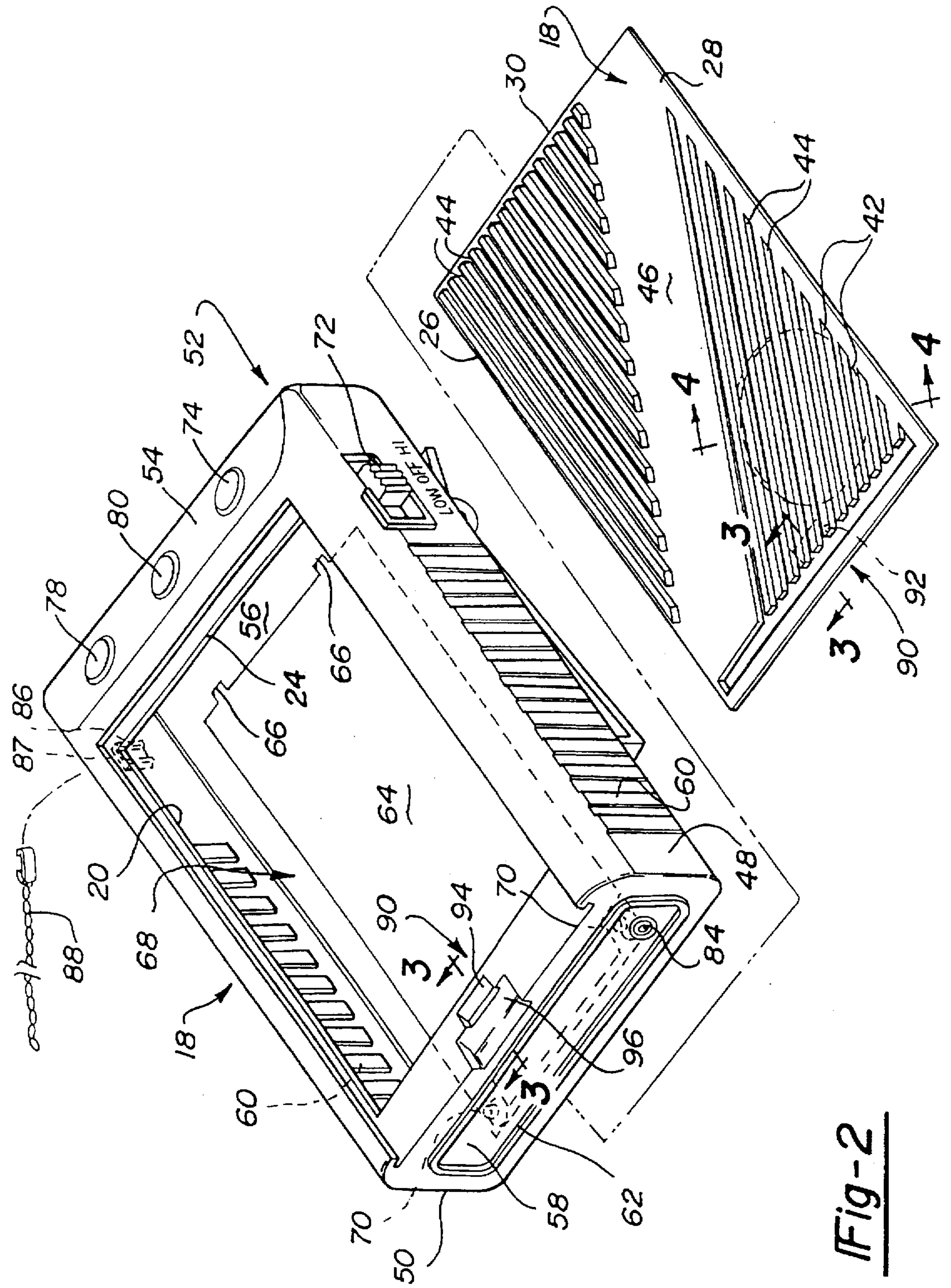
FIG. 2 is an alternative perspective view of the case utilized in the FIG. 1 embodiment of this invention.

Referring in more detail to the drawings, FIGS. 1 and 2 illustrates a multi-function beeper and housing 10 embodying this invention. The beeper has a body casing 12 and a cover 14 slidably received in an opening 16 in a front face 18 of the casing which together completely encases the internal components of the beeper. The removable cover provides restricted, or limited access to the inside of the beeper, and through replacement with another cover, allows a user to change the device's facial features. Preferably, the opening 16 which substantially encompasses the front face 18 forms a pair of substantially parallel edge fitting grooves 20 and 22 terminating in an end fitting groove 24. A pair of complementary engaging edges 26 and 28 meet in sliding engagement with the grooves 20 and 22, respectfully, such that upon closure of the opening 16, a cover end edge 30 engages with fitting groove 24. The edge grooves 20 and 22 cooperate with end fitting groove 24 and the bottom edge of front face 20 to define the casing edge which encircles and defines opening 16.

Additionally, FIG. 1 shows the cover 14 removed from casing 12 to expose a pair of batteries 32 which are supported in a battery tray 34 by an inner tray 36. The inner tray 36 may be molded as part of case, may be a bonded assembly or may be removable allowing complete access, and is affixed to the casing 12 beneath the cover 14 so as to protect and encase electronic components between the inner tray 36 and casing 12 while the cover 14 is removed. Preferably, batteries 32 are each 1½ volt N cells which are connected in series. Furthermore, a tuned chamber 38 is formed beneath the inner tray 36 within casing 12 wherein the interior volume can be tailored to tune the resonating chamber in order to optimize resonating sounds produced by the beeper through a speaker 40.

Figure 4:
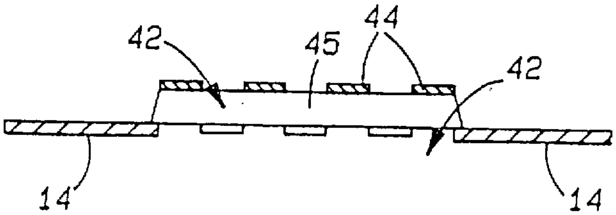
FIG. 4 is a partial sectional view taken generally on line 4—4 of FIG. 2 illustrating speaker ports formed in the cover.

Speaker 40 is preferably a piezoelectric speaker which is mounted on the inner tray 36 beneath cover 14 while assembled to the casing 12. A plurality of speaker slots, or ports 42 are formed in the cover 14 through which the speaker 40 transmits one of several possible tone generating sounds as shown in FIG. 4. Preferably, the reinforcing ribs 44 in combination with a common cross member 45 function to stiffen the cover in the region of the speaker ports 42, as the ports otherwise can excessively weaken the cover in this region. The ribbed cover also hides the speaker ports when viewed generally from a nearly plan view orientation. Additionally, the reinforcing ribs 44 stiffen the cover 14 along the direction of the ribs extending over the cover.

As shown in FIGS. 1 and 2, cover 14 includes ribs 44 arranged decoratively in two separate locations to define a clean diagonal central portion 46 on cover 14 for receiving a product name applique, advertising, or other visible features which are easily printed thereon or applied by separate decal. Preferably, an applique applied to portion 46 is formed from an adhesive backed polyester or foil label on which is silkscreened a design or message. Furthermore, reinforcing ribs 44 are preferably constructed and arranged on cover 14 to produce a decorative pattern thereon. Finally, the reinforcing ribs 44 also function to enhance tactile gripping so a user can orient the beeper device 10 through tactile manipulation.

As shown in FIGS. 1 and 2, the beeper casing 12 forms a pair of side faces 48 and 50 which are joined together by a sloped top end face 52, a sloped control face 54, a back face 56, and a bottom end face 58. The sloped top face 52 can aid viewing of the LCD by a user when affixed to shirt pocket or waistline, etc. Alternatively, the back face 56 may be removable to access internal electronics. Together, all of faces 48–58 cooperate to define opening 16 in which cover 14 is slidably engaged to completely enclose the opening. Alternatively, opening 16 can encompass more than just the front face 18. For example, cover 14 can be formed with compound corners such that the cover is received over an opening which extends over at least two faces. Additionally, opening 16 might only extend over a portion of a face such that cover 14 completely encases the opening 16.

Preferably, side faces 48 and 50 also include a plurality of ribs 60 which extend across the narrow portion of each side face to facilitate user gripping and tactile orientation of the beeper device 10. Additionally, a shallow strengthening trench 62 extends substantially circumferentially about the bottom end face 58 to produce a reinforcing bead thereabout. Furthermore, portions of the trench can be open to define an additional sound port through the case. Preferably, the casing is molded from a colored piece of polycarbonate material.

Preferably, the cover 14 is molded from a colored piece of polycarbonate material. In this version, operating instructions can be mounted on the cover back face. Alternatively, as shown in FIG. 1 a cover 14' can be molded from a transparent piece of plastic through which visible items 63 such as photographs, designs, and messages can be read which are retained within the beeper. Transparent cover 14' also has the reinforcing ribs rearranged in order to provide a large face portion through which items may be viewed.

As shown in FIG. 2, a back cover 64 is removably affixed to back face 56 to access internal components in the beeper 10 for maintenance, assembly, or repair. The top edge of the cover has a pair of clips 66 which engage along an opening 68 in the back face, and a pair of screws 70 which retain the bottom edge of the cover 64 over the opening 68. By removing the screws, the cover can be rotated out and away from the opening in the back face about clips 66 to access internal components of the beeper.

As shown in FIGS. 1 and 2, several switches are provided on beeper 10 which facilitate selective operation of the multiple-function device. A three position slide switch extends through side face 48 for facilitating operator switching between a simulated pager, panic, and standby operation mode. Preferably, slide switch 72 is positioned in an elevated position along face 48 such that when beeper 10 is gripped along its side faces 48 and 50 between a user's fingers and opposed thumb, the thumb is arranged in a proximate position adjacent the slide switch which facilitates slidable user operation therealong. Preferably, switch 72 has a sharply grooved face which easily and quickly engages with a user's thumb for switching into a panic mode, but which is more difficult to switch off since it becomes recessed when in the panic mode.

Additionally, a clock, or mode button 74, a light emitting diode 80 (LED), and an LCD set button 78 are provided in the sloped control face 54. Clock button 74 provides a toggle selection function for selecting modes of operation when setting and viewing a clock function resident in the beeper device 10. A liquid crystal display (LCD) button 78 functions to selectively change settings within particular operating modes on a liquid crystal display (LCD) 76 which is provided in the sloped top end face 52.

Furthermore, a two-line dip switch 82, or jumper switch is provided in the back of the beeper 10 beneath the back cover 64 or beneath cover 14. The dip switch 82 shown in the block diagram of FIG. 5 allows a user the option of selectively limiting the audible output levels from the piezoelectric speaker 40. For example, when beeper device 10 is being utilized by a child, it might be desirable to remove the back cover 64 by removing the screws and setting the dip switch to a low threshold sound level. By hiding the dip switch behind a cover, it becomes more difficult for a child to set the sound levels to a higher level. However, when the beeper device 10 is being utilized as an optimal panic alarm, it is desirable to set the dip switch to the high output level. Similarly, a jumper switch can be used to select an alarm clock/chime sound pattern.

Figure 5:
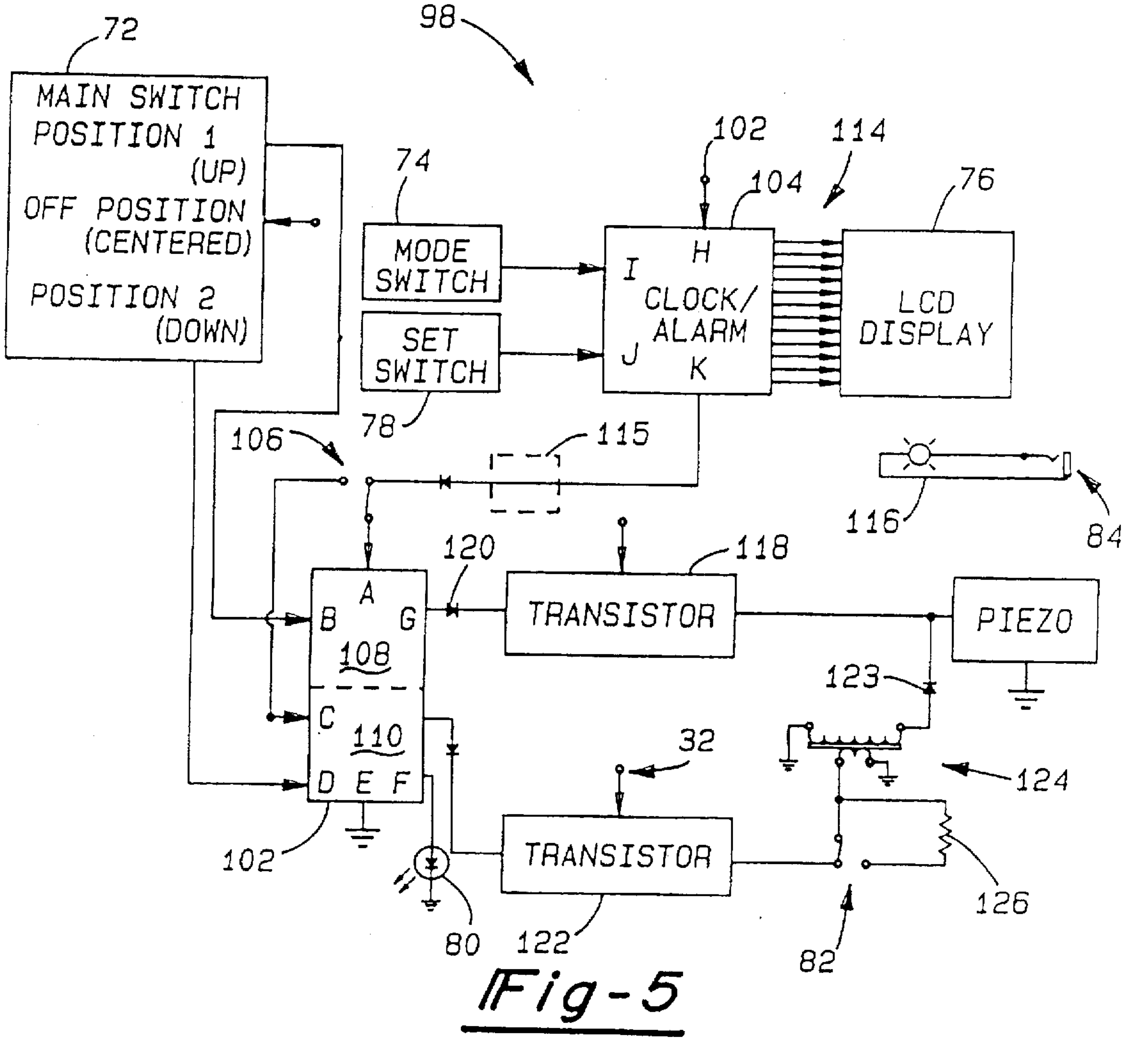
FIG. 5 is a schematic block diagram of the preferred control circuit of the present invention provided on a circuit board within the device of FIG. 1.

Preferably, an auxiliary input jack 84 shown in the block diagram of FIG. 5 extends the casing 12 to provide a power supply connection for back lighting the liquid crystal display. Preferably, the input jack 84 is mounted through a bottom portion of side face 50. Also, a connector bar 86 is preferably mounted in a local recess 87 formed in face 50 substantially opposite the slide switch 72 in the face 48 to allow for the attachment of a safety chain 88. The safety chain 88 has a removable clip which fastens to the bar to provide a lanyard for use by a user to prevent loss of the device, especially during utilization of the panic alarm so that a mugger or attacker cannot easily take the device from the user.

Figure 3:
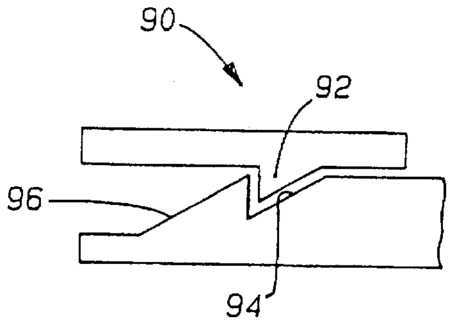
FIG. 3 is a partial sectional view taken generally along line 3—3 of FIG. 2.

Preferably, in order to retain cover 14 in complete engagement with casing 12, a fastener 90 is formed between the cover and casing as shown in FIG. 3. Preferably, a sloped male member 92 extends from a back face of cover 14 along its bottom edge. A complementary female catch 94 is formed in a corresponding bottom portion of casing 12 adjacent opening 16. A ramped guideway 96 is formed adjacent to catch 94 to facilitate passage of the sloped male member 92 into the catch 94 as the cover is slid into the casing along edge grooves 20 and 22. Preferably, the female catch 94 is constructed and arranged in relation to the male member 92 such that just before the cover engages end fitting groove 24, the male member 92 ramps up guideway 96 to snap engage into the female catch 94 which retains the cover therein. As the male member biases against guideway 96, the cover ever so slightly flexes outwardly which positively biases male member 92 into female catch 94 when they are fully engaged. To facilitate removal of the cover from the casing, a small coin is preferably inserted into the flat base portion of guideway 96 to outwardly bias the cover along its central portion which spaces apart the male member from the female catch to allow slidable removal of the cover from the casing.

Alternatively, one or more male buttons can be provided on the back face of the cover which each engage with a corresponding female depression in the casing. Furthermore, a friction-engaging device can be provided for retaining the cover to the casing. Irrespective of the type of fastening device utilized, it is necessary that the cover maintain engagement with the casing under normal operation, and at the same time, that the cover be quickly and easily removable without the use of tools or complicated assembly devices.

FIG. 5 illustrates a sound driver circuit 98 preferably utilized in the beeper device 10 of this invention. The circuit 98 is preferably provided on a printed circuit board 100 with use of surface mount and die bonded components wherein the circuit board is mounted to the inside of the casing 12 beneath inner tray 36 and casing 12. A masked Integrated Circuit (IC) sound chip 102 having internal Read Only Memory (ROM) and an internal clock function burned into the chip selectively drives piezoelectric speaker 40 to produce both pager and panic audible tones. Additionally, a clock/alarm Integrated Circuit (IC) 104 provides a clock function and drives the LCD. Circuit 104 operates as an alarm clock which can trigger either the pager or panic alarm features. The clock/alarm circuit 104 selectively provides input to sound chip 102 at pins A and C. An internal switch 106 allows for user selection between pins A and C by manually activating the switch, or jumper through operator input. The user can select clock triggering of either the delayed pager features, or the panic alarm features resident in sound chip 102. Furthermore, the clock can trigger a chime function using these same two sounds.

Sound chip 102 is divided into two functional blocks as shown in FIG. 5. First, a delayed pager feature 108 is provided in a software subroutine which is burned into the ROM, or firmware in the chip memory. Secondly, a panic alarm feature 110 is also burned into ROM. By selectively activating the three position slide switch 72 from a first position, the delayed pager feature 108 is activated through pin B. Likewise, by selecting position 2 on switch 72, the panic alarm feature 110 is activated though pin D. Preferably, the sound chip 102 is a readily purchasable item, having programmability, for example firmware which is readily tailored to the customers needs by the seller to activate both the pager and panic alarm features within internal memory. Presently, Applicants have utilized a chip available from Windbond (of Taiwan) and sold under Part No. W55412, on their development prototypes. Furthermore, switch 72 is provided with a centered, or standby position which places the chip in a low power microamp drainage standby mode in order to reduce drainage on the batteries 32.

Preferably, the clock/alarm circuit 104 is a readily purchasable CMOS digital integrated circuit presently available from Samsung Electronics of San Jose, Calif. and sold under Part No. KS5195. A 1.5 Volt DC button cell battery 112 drives chip 104 at pin H and it also supports LCD 76. Clock button 74 and LCD button 78 drive pins I and J, respectively. Furthermore, a databus, or ribbon cable 114 connects clock chip 104 with the liquid crystal display 76. Preferably, an additional LCD backlight 116 is provided beneath the LCD display to facilitate reading under conditions of lower ambient light. The backlight 116 is preferably powered with the auxiliary input jack 84 in order to conserve drainage on the batteries. Additionally, auxiliary input jack 84 can receive a subordinate battery pack which mates with the jack to provide a source of battery power for backlighting the liquid crystal display. Alternatively, a wall-mounted AC/DC connector outputting a 3 Volt source in a feed line mates with the jack to drive the backlight. Button cell battery 112 is provided solely to drive and support the clock integrated circuit 104 and LCD 76. Tentatively, the button cell is not necessary if design protection is provided between pin K on chip 104 and switch 106, for example, by adding a transistor which isolates the 1.5 Volt circuit from the sound chip 102. Additionally, a transistor can be utilized to protect the clock from transient spikes during use of the piezoelectric speaker 40, and further a capacitor can be added which allow for preferably a 120 second battery placement which supports memory resident in the circuit 104.

The delayed pager feature 108 on chip 102 drives the piezoelectric speaker 40 through a high gain transistor 118. Diode 120 functions to prevent induced spikes from damaging the sound I.C. between the pin and speaker.

Panic alarm feature 110 additionally drives speaker 40 through a high gain transistor 122, and a diode 123 by way of dip, 82, or jumper switch discussed hereinabove and a transformer 124 which boosts the signal for output to the piezoelectric speaker 40 from about 3 volts to about 90 volts. Transistors 118 and 122 can be the same transistor where a specific application and circuit design requirements will permit. By selectively setting the switch 82, or jumper switch toward resistor 126, the volume of the piezoelectric speaker can be reduced to a volume more acceptable, or safer to a young child. By placing the dip switch beneath cover 64, the output volume is not easily switched by a young child. Alternatively, the switch can be provided in a recessed manner on the casing exterior or under cover 14 in a manner which proves difficult for a young child to manually actuate or change. Furthermore, the panic alarm feature 110 also drives LED 80 through pin F which flashes both during the activation of the panic and the pager features from chip 102 through speaker 40.

In operation, internal switch 106 is used to select the sound pattern triggered by the alarm clock and/or the chime features of circuit 104. Likewise, dip switch 82 is used to select the sound volume of the panic alarm output between low and high volumes.

Figure 6A:
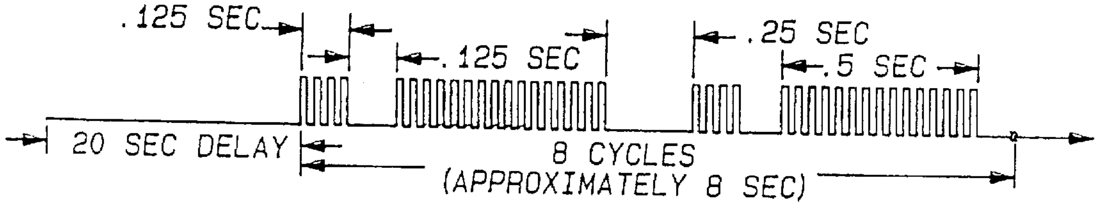
FIG. 6*a* depicts the delay pager pattern produced by the circuit represented in FIG. 5.

FIG. 6 indicates exemplary delayed pager and panic alarm signals output to the piezoelectric speaker 40 for producing corresponding audible sounds. As shown in FIG. **6*a*, when slide switch 72 is in position 1, the corresponding delayed pager pattern is produced by software resident in memory in the delayed pager feature 108 of sound chip 102. A short burst is followed by a short delay which is subsequently followed by a long burst and a somewhat longer pause after which the sequence is repeated. Preferably, once the pager pattern is terminated, chip 102 enters a low power (less than 20 Microamp) standby state. Alternatively, a separate power switch can be provided on the beeper 10 for deactivating the device and placing it into a battery conserving standby mode. Preferably, the standby current is low enough that it isn't required. Furthermore, provision can be made for a continuously generated pager sequence which repeats after each series of delay cycles, and terminates only when slide switch 72 is manually moved to the centered, or off/standby position. The short burst of patterns activated by the hourly chime feature are selectively triggered by positioning of internal switch 106** between a panic sound and a pager sound.

Figure 6B:
FIG. 6*b* depicts a representative panic alarm produced by the device illustrated in FIG. 5.

As shown in FIG. **6*b*, positioning of slide switch 72 in position 2 initiates a continuous pattern panic alarm signal for driving speaker 40. By switching selector 82 through resistor 126, the volume can be reduced. Preferably, the frequency oscillates in order to maximize piezoelectric output, as depicted in FIG. 6*b*. Preferably, the output continuously repeats and has a period of approximately 0.25 seconds. Preferably, the continuous output is driven until switch 72 is returned to the centered, or standby position. Preferably, switch 72 is difficult to return to the standby position. Furthermore, toggling of switch 106 between pins A and C will select between the panic tone sound pattern and a pager tone sound pattern in response to toggled activation of clock button 74** for both the hourly chime and alarm clock trigger activation.

It is to be understood that the invention is not limited to the exact construction illustrated and described above, but that various changes and modifications may be made without departing from the spirit and scope of the invention as defined in the following claims.

We claim:

1. An electronic device comprising:

(a) a body casing having a front face, a back face, and a peripheral edge portion comprising at least one side face communicating between said front face and back face defining an internal space therein;

(b) a speaker for producing a sound;

(c) circuit means for driving said speaker to produce a sound which simulates a pager following a fixed pre-programmed timed delay after user activation; and (d) means for user activation of said circuit means.

2. The device of claim 1 further comprising an alarm clock and wherein said circuit means is operable for activation by said user or by an alarm clock setting to produce said sound which simulates a pager.

3. The device of claim 2 wherein said circuit means includes means for selectively varying output volumes from said speaker.

4. An electronic device comprising:

(A) a body casing having a front face, a back face, and a peripheral edge portion comprising at least one side face communicating between said front face and back face defining an internal space therein;

(B) a speaker for producing a sound;

C) circuit means for driving said speaker to produce a sound which simulates a pager following a pre-programmed timed delay after user activation;

D) means for user activation of said circuit means;

wherein said circuit means includes an alarm clock operable to produce an audible alarm sound with said speaker.

5. The device of claim 1 wherein said circuit means includes means for driving said speaker to produce a panic sound with said speaker in response to user activation.

6. The device of claim 1 wherein said body casing includes:

a casing edge formed in said casing to provide a face opening in at least one of said casing faces having at least one fitting groove therealong;

a cover face plate for substantially enclosing at least one of said face openings having at least one engaging edge for removably engaging said cover in said fitting groove; and a fastening member for positively retaining said cover in engagement with said casing whereby said cover face plate is removable and interchangeable with another cover face plate to change the visible appearance of the housing.

7. The device of claim 6 wherein said fastening member comprises a complementary pair of mating male and female portions, one of said portions provided on said cover and the other of said portions provided on said casing.

8. The device of claim 5 wherein said cover face plate is a face cover with a pair of spaced-apart and substantially parallel engaging edges, wherein said casing edge substantially encompasses said casing front face where it is removably engaged with a pair of complementary engaging grooves provided on said casing for slidably mating with said cover engaging edges to retain said cover to said casing.

9. The device of claim 6 which further comprises a speaker port provided in said cover for transmitting speaker-generated sounds from the speaker within said casing.

10. The device of claim 9 which further comprises a plurality of elongated reinforcing ribs formed on said cover face plate on a visible outer portion when assembled to the housing, said ribs operable to visibly mask said speaker port from user view and to enforce said cover so as to enhance positive retention of said cover to said casing about said fastener.

11. The device of claim 10 wherein said ribs are constructed and arranged to produce decorative facial features on said cover.

12. The device of claim 6 wherein said cover face plate is transparent.

13. The device of claim 12 further comprising a photographic image beneath said transparent cover face plate for display therethrough.

14. The device of claim 12 further comprising a printed image retained beneath said cover face plate for viewing therethrough.

15. The device of claim 9 which further comprises a battery compartment constructed and arranged within said body casing such that said cover face plate is removable to facilitate access to batteries contained therein.

16. The device of claim 1 further comprising;

an alarm clock operable to produce a first output signal; and said circuit means includes a sound IC operable to produce a second output signal;

said speaker being operable in response to either of said first or second output signals for generating an audible sound.

* * * * *